United States Patent
Ogino

[11] 4,126,378
[45] Nov. 21, 1978

[54] TELEPHOTO LENS SYSTEM HAVING AN IMPROVED FOCUSING CAPABILITY

[75] Inventor: Shuji Ogino, Osaka, Japan

[73] Assignee: Minolta Camera Kabushiki Kaisha, Osaka, Japan

[21] Appl. No.: 779,297

[22] Filed: Mar. 21, 1977

[30] Foreign Application Priority Data

Mar. 26, 1976 [JP] Japan .................. 51-34011

[51] Int. Cl.² ............................. G02B 13/02
[52] U.S. Cl. .......................... 350/214; 350/215; 350/216
[58] Field of Search ............... 350/215, 216, 214

[56] References Cited

U.S. PATENT DOCUMENTS 3,868,174  2/1975  Yakota .................. 350/216
3,966,307  6/1976  Tojyo ................... 350/216

FOREIGN PATENT DOCUMENTS 2,617,727  11/1976  Fed. Rep. of Germany ........... 350/215

Primary Examiner—Conrad J. Clark
Attorney, Agent, or Firm—Harold L. Jackson; Stanley R. Jones; Joseph W. Price

[57] ABSTRACT

A telephoto lens system having improved focusing capabilities is provided wherein a first lens group of an overall positive refractive power is mounted on the object side of a second lens group of an overall negative refractive power. The lens components of the second lens group are capable of providing a simplified focusing mode of operation. The second lens group can comprise a first negative lens component and an image side second positive lens component. The second positive lens component is movably mounted for focusing the entire lens system on relatively close objects as its translates toward the object side. The first lens group is spaced a distance from the second lens group having an absolute value greater than $0.15f$ wherein $f$ is the focal length of the entire lens system. Additionally, the composite absolute values of the focal lengths of the front lens group and the negative lens component of the second lens group is greater than $1.2f$.

9 Claims, 28 Drawing Figures

FIG.1
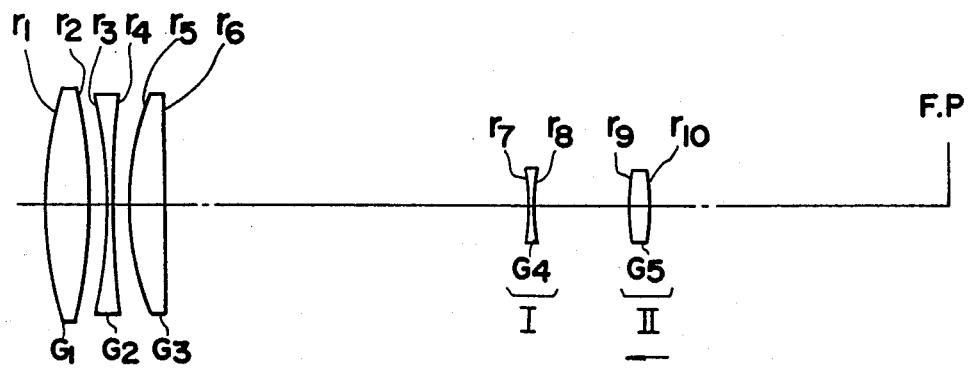
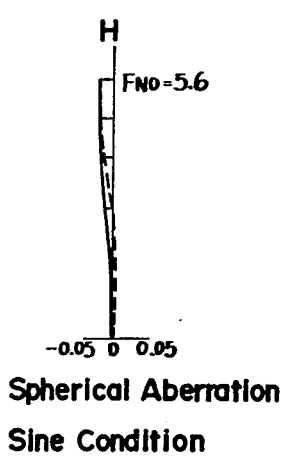
Spherical Aberration
Sine Condition
FIG.2a
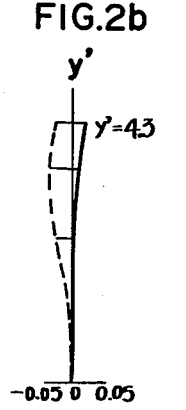
Astigmatism
FIG.2b
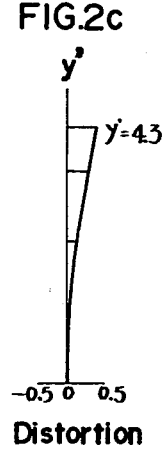
Distortion
FIG.2c
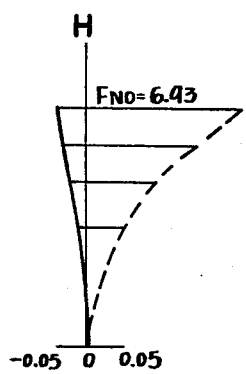
Spherical Aberration
Sine Condition
FIG.3a
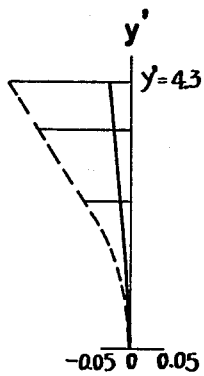
Astigmatism
FIG.3b
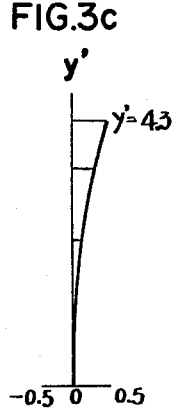
Distortion
FIG.3c FIG.4
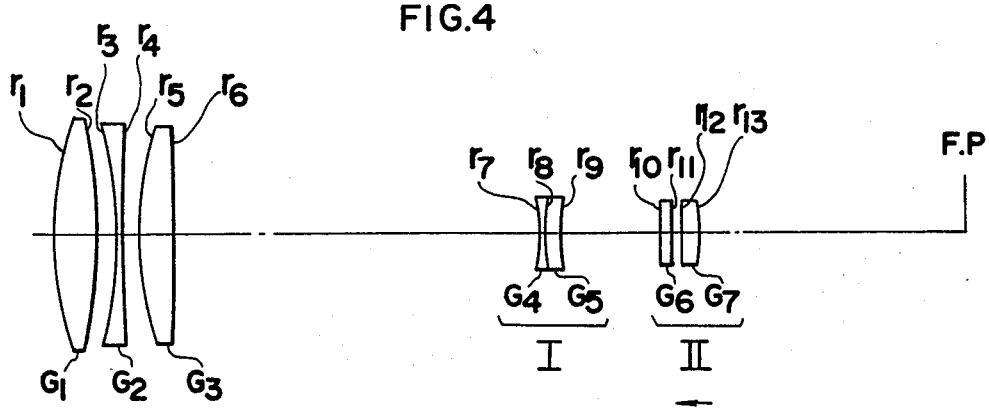
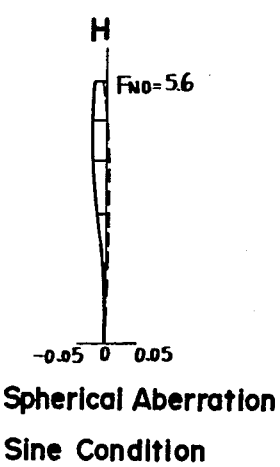
FIG.5a
Spherical Aberration
Sine Condition
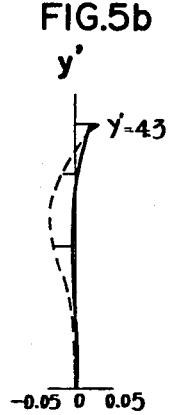
FIG.5b
Astigmatism
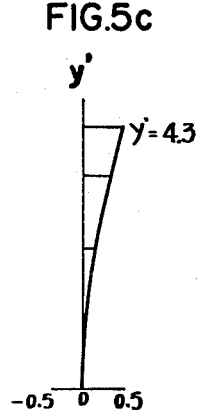
FIG.5c
Distortion
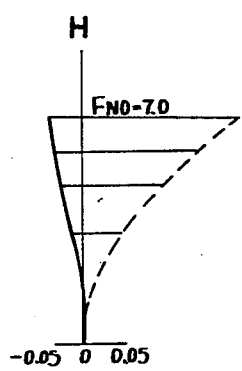
FIG.6a
Spherical Aberration
Sine Condition
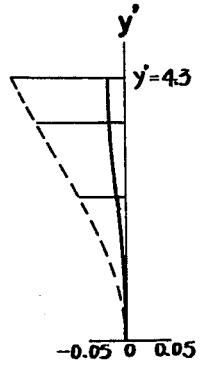
FIG.6b
Astigmatism
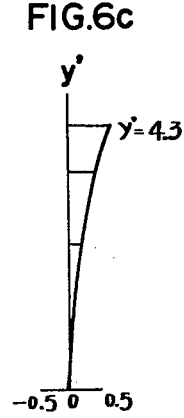
FIG.6c
Distortion Spherical Aberration
Sine Condition Astigmatism Distortion Spherical Aberration
Sine Condition Astigmatism Distortion Spherical Aberration
Sine Condition Astigmatism Distortion Spherical Aberration
Sine Condition Astigmatism Distortion

TELEPHOTO LENS SYSTEM HAVING AN IMPROVED FOCUSING CAPABILITY

BACKGROUND OF THE INVENTION

1. Field of the Invention

The present invention relates to telephoto optical lens systems and more particularly to an improved simplified focusing mode of operation.

2. Description of the Prior Art

In the general field of photographic lens systems, focusing has been frequently accomplished by the shifting of the entire lens element assembly. This is sometimes a relatively easy expedient for focusing in smaller compact lens assemblies of a fixed focal length.

However, in a telephoto lens assembly, its diameter, overall length and weight are by necessity increased over both a standard and wide angle lens systems. Accordingly, any focusing arrangement which requires the shifting of the entire telephoto lens system would also require mechanisms that are by necessity relatively complex, strong and durable. Additionally, the shifting distance for focusing is also necessarily increased. Needless to say these requirements all contribute to a higher cost for the lens barrel and produce both increased weight and size.

Modern photographic demands have required more compact and lighter telephoto lens systems. As any photographer knows, the relative weight of a telephoto lens system makes this system extremely hard to be held stable and adds human physiological vibrations that are introduced into the image plane of the camera.

Optical designers, when working with a telephoto lens assembly design have attempted to simplify focusing by shifting a rear lens component. These rear lens components are generally relatively small in diameter and of light weight, especially compared with the more conventional systems wherein the entire lens assembly are shifted as a unit. By utilizing this design approach, a shiftable rear lens component in a telephoto lens system generally has the advantage of a reduced lens movement, less barrel manufacturing cost and greater ease of operation. This design approach, however, suffers a disadvantage in that a variation in aberrations, due to movement of this rear lens component, are greater than in the conventional system. Particularly, excessive negative spherical aberration is introduced into the system. As is well-known in the optical design field, a telephoto lens system in its nature requires a considerable under correction of spherical aberration in the front lens components. This under balance is remedied by over correction of the spherical aberration in the rear lens components. This balance is disturbed when the rear lens component is shifted, thus introducing an unwanted negative spherical aberration.

Another factor in designing a focusing mode of operation for a telephoto lens system relates to the paraxial region and the particular direction of movement of the shiftable lens components in the lens system when focusing at an object which is relatively close to the front of the lens barrel. In this regard, consideration must be given to the image formation characteristics of the shiftable lens components. Thus, in a paraxial image formation diagram of a lens system, the lens system will be focused at a close object when the movable focusing lens components are shifted in the direction of diminishing the distance between the object point and the image point for the shifting lens components. Supposing that the rear lens group of a telephoto lens system is divided into a plurality of lens components, focusing is generally possible unless the object distance of each lens component in the rear lens group, is shorter than the image distance thereof. Generally, focusing at a relative close object is made possible when one of the divided rear lens components is shifted toward the object side and has a positive refractive power or is shifted toward the image side if it has a negative refractive power.

A system of focusing a telephoto lens assembly at relatively close objects by shifting a positively refracting rear lens component has a disadvantage in that the correction of aberrations is made difficult by the necessary increased negative refracting power of the other lens components in the rear lens group. If, on the other hand, the negative refractive power is designed into the other lens components in the rear lens group to permit a correction of spherical aberration, then it becomes extremely difficult to obtain the desired telephoto ratio. For these reasons, the prior art, when seeking a simplified focusing mechanism, has resorted to shifting a negative refracting lens group toward the image side. Typical examples of such focusing systems are described in the following Japanese Patent applications that have been laid open to inspection to the public, Japanese Patent Application Laid Open No. 17723/1974; Japanese Patent Application Laid Open No. 139732/1975 and Japanese Patent Application Laid Open No. 32327/1976.

Thus, there is still a demand in the prior art to provide a simplified mode of focusing in telephoto lens assemblies.

SUMMARY OF THE INVENTION

The present invention provides a telephoto lens system having a relatively simplified focusing mode of operation with improved optical characteristics. The telephoto lens system achieves this mode of focusing operation by shifting a positively refracting lens component in the rear lens group toward the object side to provide improved focusing for a relatively close object.

The telephoto lens system having the improved focusing capability includes a front lens group of an overall positive refractive power and a rear lens group of an overall negative refractive power. The rear lens group includes a first negative lens component on the object side of the rear lens group and a second positive lens component on the image side. Focusing is accomplished on objects that are relatively close to the lens system by the movement of the second positive lens component in the rear lens group toward the object side.

Additionally, certain parameters are highly advantageous in the present invention, for example, the front lens group should be spaced a distance from the rear lens group greater than $0.15f$, wherein $f$ is the focal length of the entire telephoto lens system. The absolute value of the composite focal length, $f_M$ of both the front lens group and the first negative lens component is greater than $1.2f$. Finally, the focal length $f_2$, of the second positive lens component is less than $0.8F$.

In alternative embodiments, wherein a relatively lesser telephoto ratio is required for the lens system, the rear lens group can be further augmented by the addition of a third negative lens component at the image side of the second positive lens component. Focusing is accomplished by shifting the first negative lens component toward the object side with a lower differential speed ratio than that of the second positive lens component, which is also shifted.

The features of the present invention which are believed to be novel are set forth in particularity in the appended claims. The present invention, both as to its organization and manner of operation, together with further objects and advantages thereof, may be best understood by reference to the following description taken in conjunction with the accompanying drawings.

BRIEF DESCRIPTION OF THE DRAWINGS

FIG. 1 is a cross-sectional schematic view disclosing a first embodiment as Example 1;

FIG. 2A, 2B and 2C disclose respectively the spherical aberration, astigmatism and distortion when the lens system is focused at infinity;

FIGS. 3A, 3B and 3C disclose respectively the spherical aberration, astigmatism and distortion when the first embodiment is focused at a distance 2,000;

FIG. 4 is a cross-sectional schematic view of a second embodiment of the present invention as Example 2;

FIGS. 5A, 5B and 5C disclose respectively the spherical aberration, astigmatism and distortion when Example 2 is focused at infinity;

FIGS. 6A, 6B and 6C disclose respectively the spherical aberration, astigmatism and distortion when the second embodiment is focused at a distance 2,000;

BRIEF DESCRIPTION OF THE PREFERRED EMBODIMENTS

Figure 7:
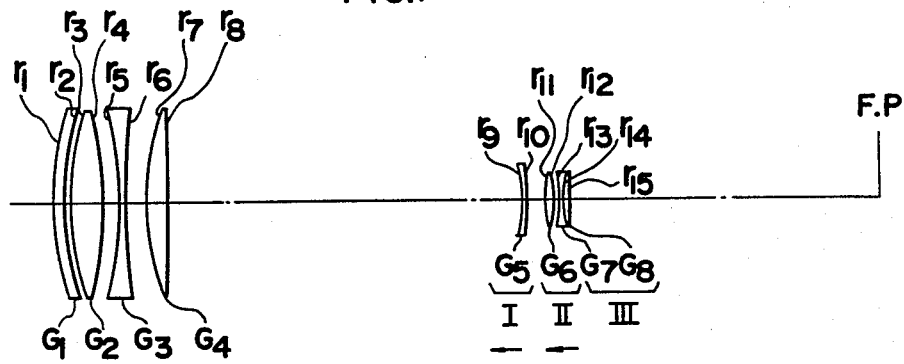
FIG. 7 shows a cross-sectional schematic view of a third embodiment of the present invention as Example 3.

The following description is provided to enable any person skilled in the optical design field to make and use the invention and sets forth the modes contemplated by the inventor of carrying out his invention. Various modifications, however, will remain readily apparent to those skilled in the art, since generic principles of the present invention are defined herein specifically to provide a telephoto lens system that can be manufactured in a relatively economical manner. Derivation of the formulae and their relation set forth herein can be accomplished with the assistance of a computer. The present invention represents the parameters of a compromised balance of accepted aberrations in a relatively easy manufactured and low cost telephoto lens system for utilization, for example, with a camera.

In the accompanying drawings which are further supplemented by the enclosed tables, the lenses in accordance with the present invention, are illustrated diagrammatically with light being assumed to travel from left to right. The individual lenses which are designated by the letter, G, have subscripts indicating the number of the lenses as numbered consecutively from the object to the image side. The radii of curvature of the lenses is indicated by, $r$, with a subscript corresponding to the consecutive numbers of the lens element. Groups of lens elements are indicated by Roman numerals.

Referring to FIG. 1, a first embodiment of a telephoto lens assembly of the present invention is disclosed wherein a front lens group has an overall positive refractive power and will generally comprise a number of individual lens components. The rear surface of the front lens group is positioned a set distance from the front surface of a rear lens group. This intervening air space, $d'$, will be not less than 0.15 times the focal length of the entire lens system;

$$d' > 0.15f \tag{1}$$

The rear lens group will have an overall negative refractive power to balance the front lens group. This particular arrangement is capable of reducing the telephoto ratio to thereby provide a highly desirable compact lens system.

As can be appreciated by those skilled in the optical design field an equivalent thin lens system can be referred to to disclose the advantages of the above suggested design options. Thus, in a telephoto lens system that comprises a positive front lens group and a negative rear lens group, the air space between the two lens groups can be expressed in terms of a thin lens system as one-half of the distance between the front lens group and the focal plane. In this system, a minimum telephoto ratio is possible with a minimum refractive power. If the air space separating these two lens groups is reduced to less than $0.15f$ times the focal length of the lens system, it is extremely difficult to obtain low telephoto ratios.

Further, in an attempt to resolve the spherical aberration problems, the present design further divides the rear lens group into at least two subgroups. The lens group which lies nearest the object is designated as Lens Group I, and has a negative refracting power. On the image side of Lens Group I, is Lens Group II, which has a positive refracting power. The relationship of the focal length of the first Lens Group I to that of the front lens group and the focal length of the entire lens system is set forth in the following equation;

$$1.2f > |f_M| \tag{2}$$

wherein $f$ is the focal length of the entire lens system and $f_M$ is the composite focal length of the front lens group and Lens Group I of the rear lens group.

By adhering to the design parameter set forth in equation (2), it is possible to minimize any variation in the spherical aberration during the focusing mode of operation. Thus, it is possible to balance the under correction of spherical aberration in a front lens group by over correcting the spherical aberration in Lens Group I, so that the exiting paraxial ray emerging from Lens Group I will be as parallel as possible to the optical axis. In other words, by satisfying equation (2), it is possible to make certain that the height of the incidence of a paraxial ray entering the Lens Group II will not be significantly altered even if Lens Group II is shifted. Accordingly, this result permits the reduction of any variation of spherical aberration during the focusing mode of operation. As can be appreciated, a reduced change in the height of incidence further means a reduced alteration in any longitudinal chromatic aberrations.

If equation (2) is not adhered to, the variation in spherical and longitudinal chromatic aberrations that are introduced into the lens system during a focusing operation are increased and any attempts to correct this problem renders it difficult to achieve a correction of aberrations with the object at infinity. With respect to aberrations for off-axial rays, the variation in the off-axial aberrations during focusing is reduced by positioning the movable lens group near the point of intersection of the principle ray of the off-axial pencil of rays with the optical axis. Thus, the condition $1.2f > |f_M|$ is not only relevant to the paraxial ray, but is a condition that must be met for bringing the off-axial ray emerging from Lens Group I into a relationship with the optical axis as parallel as possible to reduce changes in off-axial abberations.

Referring specifically to FIG. 1, movement of the Lens Group II in the direction of the arrow; that is, toward the object side permits focusing of an object that is relatively close to the lens barrel.

As can be seen from the parameters of Examples 1 and 2, when the telephoto ratio is more than 0.74, aberration correction for the lens system is possible even if the entire negative refracting power that is utilized for balancing the positive refractive power is in the Lens Group I alone. Accordingly, in this condition, focusing is possible by shifting Lens Group II alone toward the object side. Thus, even when the Lens Group II alone is shifted, little change will occur in the aberrations and moreover any aberrations with the object at infinity can still be maintained within a tolerable range.

If, on the other hand, the telephoto ratio is less than about .7 and the Lens Group I in the rear lens group is the only lens component that is negatively refractive, then the correction of aberrations with respect to an object at infinity is made extremely difficult or the amount of aberrations due to a shifting of the Lens Group II is increased. Thus, when a telephoto ratio of less than about 0.7 is required the negative refractive power of the rear lens group is shared by two or more lens components such as shown in Examples 3 and 4, so that the burden of relying upon the negative refractive power of Lens Group I will be reduced. With this reduced negative power in Lens Group I, the height of the light ray incident on Lens Group II, relative to the optical axis is somewhat altered as Lens Group II is shifted with the result that negative spherical aberration is introduced. To adjust for this introduction of aberration, the Lens Group I is shifted toward the object side in correlation with the Lens Group II at a predetermined differential speed ratio. Since the two lens groups are moved, a degree of latitude is thereby provided to correct the aberrations.

In order to be insured that the off-axial ray will be subject to an effect analogous to that encountered by the paraxial ray, it is necessary the following condition be satisfied;

$$|r_F| > |r_R| \quad (3)$$

wherein, $r_F$ is the radius of curvature of the surface of Lens Group II which lies closest to the object and $r_R$ is the radius of curvature of Lens Group II which lies closest to the image side.

If this equation is not adhered to, then either the upper marginal ray or lower marginal ray of the off-axial pencil of rays will be subject to strong refraction. As a result of this strong refraction a variation in the coma will result as the direction of the refraction of the ray is altered by the shifting of the Lens Group II during focusing.

Another design parameter to consider in improving the focusing mode of operation is to control the magnitude of movement of the Lens Group II. Accordingly, the amount of movement necessary for Lens Group II can be reduced when the following condition is adhered to;

$$0.8f > f_2 \quad (4)$$

wherein $f_2$ is the focal length of the Lens Group II and $f$ is the focal length of the entire lens system.

If this condition is not adhered to, then the required movement during focusing is increased to an extent that the lens barrel itself will require a greater amount of design consideration and can become more costly to manufacture.

When focusing the entire lens system by shifting both Lens Group I and Lens Group II toward the object side, it is advantageous to design the relative movement so that the amount of movement of Lens Group I will be smaller than that of Lens Group II. This condition is desirable because the function of Lens Group I is to reduce the variations in aberrations while generally the task of focusing rests primarily on Lens Group II. Thus, because of its negative refractive power, Lens Group I should be held as stationary as possible to minimize any adverse focusing effects occurring when Lens Group I is moved towards the object side. In addition, Lens Group I has a strong tendency to introduce a positive spherical aberration when shifted toward the object side and if the amount of movement of this lens group is large it produces an excessive positive spherical aberration in the resulting image.

Generally, it is advantageous to limit the movement of Lens Group I to that necessary to compensate for the slightly negative spherical aberration that can be introduced during focusing by the movement of the Lens Group II.

In the following Tables, the minus signs indicate surfaces concave toward the object side while the surfaces without a sign are convex toward the object side. The Tables also disclose the axial spacings, $d$, along the optical axis and include both the axial space between the lens elements and the thickness of the lens elements. The axial spacings between the lens elements are positioned accordingly relative to the radii in the Tables while the thicknesses are designated accordingly between the radii. All other axial spacings greater than zero refer to air spacings. All linear dimensions are given in absolute values and are given with preference to the equivalent focal length of unity.

The Tables also provide with respect to each example, the F number, the total angle of view, $2\omega$, the refractive index, $n$, and the Abbe number, $\nu$.

In Table 2, the Siedel aberration coefficients of the telephoto lens system focused at infinity are disclosed in Table 1.

FIGS. 2A, 2B and 2C disclose respectively plots of the spherical aberration, astigmatism and distortion for the embodiment of FIG. 1. The aberrations set forth in FIGS. 2A, 2B and 2C relate to the condition of Example 1 wherein the photographic distance is infinity.

Referring specifically to the schematic cross-sectional view of FIG. 1 and Table 1, the front lens group comprises lens elements G1, G2 and G3 and the rear lens group comprises lens elements G4 and G5 which can be further subdivided into Lens Group or component I, G4, and Lens Group or component II, G5. The focusing mode of operation is accomplished by shifting the lens element G5 toward the object side. When the photographic distance from the object to the focal plane is 2,000; the distance between the lens groups is $d8 = 2.422$. The aberrations in FIGS. 3A, 3B and 3C disclose the aberration curves that exist when the photographic distance is 2,000 for Example 1.

Table 1

Embodiment 1

$f = 100 \quad F \text{ No.}: 5.6 \quad 2\omega = 4° 57'$
Telephoto Ratio: 0.744   Photographing Distance: ∞

| Radius of Curvature | | Axial Distance | | Refractive Index | Abbe Number |
|---|---|---|---|---|---|
| G1 | $r_1 = 35.72$ | | | | |
| | | $d_1 =$ | 3.3 | $n_1 = 1.4875$ | $\nu_1 = 70.1$ |
| | $r_2 = -55.605$ | | | | |
| | | $d_2 =$ | 1.5 | | |
| G2 | $r_3 = -46.125$ | | | | |
| | | $d_3 =$ | 0.7 | $n_2 = 1.74$ | $\nu_2 = 37.5$ |
| | $r_4 = 170.5$ | | | | |
| | | $d_4 =$ | 1.5 | | |
| G3 | $r_5 = 28.295$ | | | | |
| | | $d_5 =$ | 2.8 | $n_3 = 1.4875$ | $\nu_3 = 70.1$ |
| | $r_6 = -250.33$ | | | | |
| | | $d_6 =$ | 30.0 | | |
| I [ G4 | $r_7 = -13.959$ | | | | |
| | | $d_7 =$ | 0.4 | $n_4 = 1.6214$ | $\nu_4 = 61.3$ |
| | $r_8 = 23.897$ | | | | |
| | | $d_8 =$ | 8.0 | (variable) | |
| II [ G5 | $r_9 = 62.186$ | | | | |
| | | $d_9 =$ | 1.5 | $n_5 = 1.5213$ | $\nu_5 = 51.1$ |
| | $r_{10} = -21.597$ | | | | |

Table 2

Embodiment 1

| Surface | Spherical Aberration | Coma | Astigmatism | Petzval Sum | Distortion |
|---|---|---|---|---|---|
| 1 | 4.83 | −4.81 | 4.79 | 0.92 | −5.68 |
| 2 | 24.29 | −38.63 | 61.44 | 0.59 | −98.64 |
| 3 | −33.41 | 52.29 | −81.83 | −0.92 | 129.49 |
| 4 | 0.0 | 0.01 | 0.04 | −0.25 | −0.66 |

Table 2-continued

Embodiment 1

| Surface | Spherical Aberration | Coma | Astigmatism | Petzval Sum | Distortion |
|---|---|---|---|---|---|
| 5 | 4.57 | −4.25 | 3.95 | 1.16 | −4.75 |
| 6 | 6.48 | −11.19 | 19.34 | 0.13 | −33.64 |
| 7 | −7.52 | 7.13 | −6.75 | −2.75 | 9.00 |
| 8 | −0.03 | −0.13 | −0.54 | −1.60 | −8.78 |
| 9 | 0.0 | 0.0 | −0.09 | 0.55 | 9.40 |
| 10 | 0.94 | −0.48 | 0.25 | 1.59 | −0.95 |
| Σ | 0.14 | −0.08 | 0.60 | −0.59 | −5.23 |

The design parameters of Table 3 provide a second example of the present invention wherein G1, G2 and G3 taken together represent the front lens group and G4, G5, G6 and G7 taken together represent the rear lens group. The lens elements G4 and G5 represents the Lens Group I while lens elements G6 and G7 represent Lens Group II. The focusing mode of operation can be accomplished by shifting only Lens Group II as a unit toward the object side and when the photographic distance is 2,000, $d_9 = 2.469$.

Table 3

Embodiment 2

$f = 100 \quad F \text{ No.}: 5.6 \quad 2\omega = 4° 57'$
Telephoto Ratio: 0.751   Photographing Distance: ∞

| Radius of Curvature | | Axial Distance | | Refractive Index | Abbe Number |
|---|---|---|---|---|---|
| G1 | $r_1 = 34.850$ | | | | |
| | | $d_1 =$ | 3.3 | $n_1 = 1.4875$ | $\nu_1 = 70.1$ |
| | $r_2 = -54.729$ | | | | |
| | | $d_2 =$ | 1.5 | | |
| G2 | $r_3 = -45.578$ | | | | |
| | | $d_3 =$ | 0.7 | $n_2 = 1.74$ | $\nu_2 = 37.5$ |
| | $r_4 = 173.449$ | | | | |
| | | $d_4 =$ | 1.5 | | |
| G3 | $r_5 = 28.975$ | | | | |
| | | $d_5 =$ | 2.8 | $n_3 = 1.4875$ | $\nu_3 = 70.1$ |
| | $r_6 = -221.823$ | | | | |
| | | $d_6 =$ | 30.0 | | |
| I [ G4 | $r_7 = -13.911$ | | | | |
| | | $d_7 =$ | 0.4 | $n_4 = 1.6214$ | $\nu_4 = 61.3$ |
| G5 | $r_8 = 16.666$ | | | | |
| | | $d_8 =$ | 1.5 | $n_5 = 1.5213$ | $\nu_5 = 51.1$ |
| | $r_9 = 24.071$ | | | | |
| | | $d_9 =$ | 8.0 | (variable) | |

Table 3-continued

Embodiment 2

$f = 100$  F No. : 5.6  $2\omega = 4° 57'$
Telephoto Ratio: 0.751  Photographing Distance: ∞

| Radius of Curvature | | Axial Distance | Refractive Index | Abbe Number |
|---|---|---|---|---|
| G₆ | $r_{10} = \infty$ | $d_{10} = 1.0$ | $n_6 = 1.6214$ | $\nu_6 = 61.3$ |
| II | $r_{11} = -62.843$ | $d_{11} = 0.693$ | | |
| | $r_{12} = \infty$ | $d_{12} = 1.5$ | $n_7 = 1.5213$ | $\nu_7 = 51.1$ |
| G₇ | $r_{13} = -21.723$ | | | |

Table 4

Embodiment 2

| Surface | Spherical Aberration | Coma | Astigmatism | Petzval Sum | Distortion |
|---|---|---|---|---|---|
| 1 | 5.21 | −6.97 | 9.33 | 0.94 | −13.75 |
| 2 | 25.68 | −49.31 | 94.70 | 0.60 | −183.03 |
| 3 | −35.08 | 66.50 | −126.09 | −0.93 | 240.82 |
| 4 | 0.0 | 0.01 | 0.05 | −0.25 | −0.76 |
| 5 | 3.88 | −4.85 | 6.05 | 1.13 | −8.96 |
| 6 | 6.92 | −14.20 | 29.14 | 0.15 | −60.09 |
| 7 | −7.18 | 9.17 | −11.70 | −2.75 | 18.46 |
| 8 | −0.01 | −0.03 | −0.06 | −0.24 | −0.66 |
| 9 | −0.02 | −0.08 | −0.37 | −1.42 | −8.73 |
| 10 | 0.0 | 0.03 | −0.56 | 0.0 | 9.32 |
| 11 | 0.06 | −0.23 | 0.89 | 0.61 | −5.76 |
| 12 | −0.01 | 0.10 | 0.83 | 0.0 | 6.56 |
| 13 | 0.72 | −0.38 | 0.20 | 1.58 | −0.93 |
| Σ | 0.18 | −0.22 | 0.76 | −0.59 | −7.51 |

FIG. 4 is a cross-sectional schematic view of the telephoto lens system to Example 2. The aberration curves relating to Example 2 focused at a photographic distance of infinity and at 2,000 is set forth respectively in the family of curves of FIGS. 5A, 5B and 5C and FIGS. 6A, 6B and 6C. Table 4 sets forth the Siedel aberration coefficients for Example 2 with a photographic distance equal to infinity.

Table 5

Embodiment 3

$f = 100$  F No.: 6.3  $2\omega = 4° 13'$
Telephoto Ratio: 0.684  Photographing Distance: ∞

| Radius of Curvature | | Axial Distance | Refractive Index | Abbe Number |
|---|---|---|---|---|
| G₁ | $r_1 = 28.799$ | $d_1 = 0.855$ | $n_1 = 1.5168$ | $\nu_1 = 64.0$ |
| | $r_2 = 25.206$ | $d_2 = 0.427$ | | |
| G₂ | $r_3 = 22.613$ | $d_3 = 2.632$ | $n_2 = 1.4339$ | $\nu_2 = 95.0$ |
| | $r_4 = -36.991$ | $d_4 = 1.381$ | | |
| G₃ | $r_5 = -34.414$ | $d_5 = 0.684$ | $n_3 = 1.757$ | $\nu_3 = 47.7$ |
| | $r_6 = 125.075$ | $d_6 = 1.776$ | | |
| G₄ | $r_7 = 24.738$ | $d_7 = 1.538$ | $n_4 = 1.5038$ | $\nu_4 = 66.8$ |
| | $r_8 = \infty$ | $d_8 = 29.414$ (variable) | | |
| I  G₅ | $r_9 = -9.001$ | $d_9 = 0.256$ | $n_5 = 1.689$ | $\nu_5 = 49.4$ |
| | $r_{10} = -33.714$ | $d_{10} = 1.775$ (variable) | | |
| II G₆ | $r_{11} = 36.83$ | $d_{11} = 0.547$ | $n_6 = 1.5168$ | $\nu_6 = 64.0$ |
| | $r_{12} = -10.809$ | $d_{12} = 0.369$ (variable) | | |
| III G₇ | $r_{13} = -18.978$ | $d_{13} = 0.256$ | $n_7 = 1.6583$ | $\nu_7 = 57.3$ |
| G₈ | $r_{14} = 6.589$ | $d_{14} = 0.615$ | $n_8 = 1.5955$ | $\nu_8 = 39.4$ |
| | $r_{15} = \infty$ | | | |

Table 6

Embodiment 3

| Surface | Spherical Aberration | Coma | Astigmatism | Petzval Sum | Distortion |
|---|---|---|---|---|---|
| 1 | 9.40 | −5.09 | 2.75 | 1.18 | −2.13 |
| 2 | −17.40 | 10.10 | −5.87 | −1.35 | 4.19 |
| 3 | 22.07 | −13.25 | 7.96 | 1.34 | −5.58 |
| 4 | 55.24 | −54.86 | 54.49 | 0.82 | −54.93 |
| 5 | −70.17 | 68.95 | −67.75 | −1.25 | 67.80 |
| 6 | −0.01 | −0.01 | −0.02 | −0.34 | −0.47 |
| 7 | 7.88 | −3.51 | 1.56 | 1.35 | −1.30 |
| 8 | 4.44 | −5.70 | 7.33 | 0.0 | −9.43 |
| 9 | −16.39 | 4.28 | −1.12 | −4.53 | 1.47 |
| 10 | 0.26 | −0.57 | 1.27 | 1.21 | −5.53 |
| 11 | 0.0 | −0.03 | −0.41 | 0.92 | 7.27 |
| 12 | 10.77 | −0.82 | 0.06 | 3.15 | −0.25 |
| 13 | −5.77 | 1.75 | −0.53 | −2.09 | 0.80 |
| 14 | −0.47 | −0.70 | −1.04 | −0.36 | −2.08 |
| 15 | 0.16 | −0.48 | 1.44 | 0.0 | −4.36 |
| Σ | 0.01 | 0.06 | 0.15 | 0.05 | −4.52 |

FIG. 7 discloses a schematic cross-sectional view of a telephoto lens system according to Example 3 with the parameters set forth in Tables 5 and 6. As can be seen from FIG. 7, G1, G2, G3 and G4 represent the lens elements of the front lens group and G5, G6, G7 and G8 taken together represent the rear lens group. The necessary negative refractive power for compensating for the front lens group is shared by G5, which corresponds to Lens Group I and by Lens Group III which comprises lens elements G7 and G8. The second Lens Group II is made up of lens element G6. In focusing this telephoto lens system, Lens Group III is held stationary while Lens Groups I and II are shifted toward the object side at different speeds. When the photographic distance is 2,000, $d8 = 27,894$; $d10 = 0.863$; and $d12 = 2.801$.

Figure 8A:
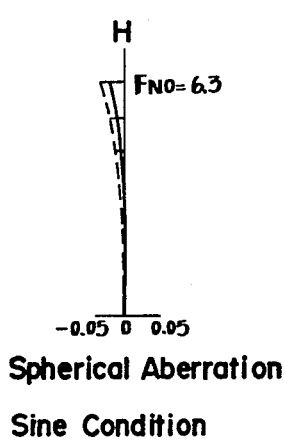
FIGS. 8A, 8B and 8C show respectively the spherical aberration, astigmatism and distortion when the third embodiment is focused at infinity.
Figure 8B:
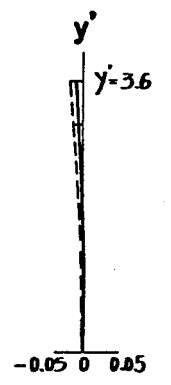
Figure 8C:
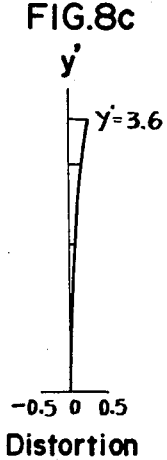
Figure 9A:
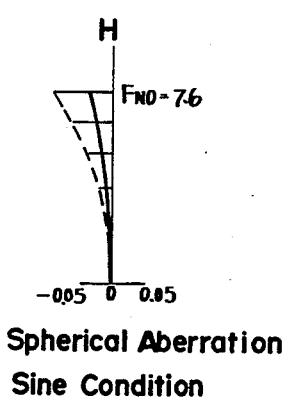
FIGS. 9A, 9B and 9C disclose respectively the spherical aberration, astigmatism and distortion when the third embodiment is focused at 2,000.
Figure 9B:
Figure 9C:
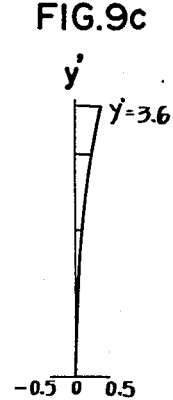

FIGS. 8A, 8B and 8C disclose the aberration curves when the system is focused at infinity, while FIGS. 9A, 9B and 9C disclose the aberration curves when the focal distance is 2,000. The Siedel aberration coefficients for Example 3 are set forth in Table 6 when the system is focused at infinity.

the Siedel aberration coefficients, for example, when the telephoto system is focused at infinity. The specific design parameters are set forth in Table 7 and lens elements G1, G2, G3 and G4 constitute the front lens group. Lens elements G5, G6, G7 and G8 represent the rear lens group. Again, as in Example 3, the balancing negative refractive power that is required from the rear lens group is distributed so that lens elements G5 and G6 are not required to compensate for the total positive refractive power introduced by the front lens group. Lens elements G5 and G6 represent the lens component I while G7 represents Lens Group II and G8 represents Lens Group III. In focusing this telephoto lens system, the Lens Group III is held stationary while Lens Groups I and II are shifted at varying rates of speed. When the photographic distance is 2,000, $d8 = 27,601$; $d11 = 0.362$; and $d13 = 3,829$.

Table 7

Embodiment 4

$f = 100$   FNo.: 6.3   $2\omega = 4°13'$
Telephoto Ratio: 0.6985   Photographing Distance: $\infty$

| Radius of Curvature | | Axial Distance | | Refractive Index | Abbe Number |
|---|---|---|---|---|---|
| G1 | $r_1 =$ 28.799 | $d_1 =$ | 0.855 | $n_1 = 1.5168$ | $\nu_1 = 64.0$ |
|    | $r_2 =$ 25.206 | $d_2 =$ | 0.427 | | |
| G2 | $r_3 =$ 22.613 | $d_3 =$ | 2.632 | $n_2 = 1.4339$ | $\nu_2 = 95.0$ |
|    | $r_4 =$ −36.991 | $d_4 =$ | 1.381 | | |
| G3 | $r_5 =$ −34.414 | $d_5 =$ | 0.684 | $n_3 = 1.757$ | $\nu_3 = 47.7$ |
|    | $r_6 =$ 125.078 | $d_6 =$ | 1.776 | | |
| G4 | $r_7 =$ 26.177 | $d_7 =$ | 1.538 | $n_4 = 1.4875$ | $\nu_4 = 70.1$ |
|    | $r_8 =$ −407.01 | $d_8 =$ | 28.886 | (variable) | |
| I { G5 | $r_9 =$ −9.205 | $d_9 =$ | 0.256 | $n_5 = 1.6779$ | $\nu_5 = 55.4$ |
|    | $r_{10} =$ 9.134 | $d_{10} =$ | 0.684 | $n_6 = 1.5827$ | $\nu_6 = 46.4$ |
| G6 | $r_{11} =$ −20.903 | $d_{11} =$ | 1.197 | (variable) | |
| II { G7 | $r_{12} =$ −55.207 | $d_{12} =$ | 0.564 | $n_7 = 1.5258$ | $\nu_7 = 52.1$ |
|    | $r_{13} =$ 10.041 | $d_{13} =$ | 1.709 | (variable) | |
| III { G8 | $r_{14} =$ −16.682 | $d_{14} =$ | 0.256 | $n_8 = 1.67$ | $\nu_8 = 57.1$ |
|    | $r_{15} =$ 179.046 | | | | |

Table 8

Embodiment 4

| Surface | Spherical Aberration | Coma | Astigmatism | Petzval Sum | Distortion |
|---|---|---|---|---|---|
| 1 | 9.40 | −4.62 | 2.27 | 1.18 | −1.70 |
| 2 | −17.40 | 9.24 | −4.91 | −1.35 | 3.33 |
| 3 | 22.07 | −12.16 | 6.70 | 1.34 | −4.43 |
| 4 | 55.24 | −52.12 | 49.18 | 0.82 | −47.18 |
| 5 | −70.16 | 65.46 | −61.08 | −1.25 | 58.16 |
| 6 | −0.01 | −0.01 | −0.02 | −0.34 | −0.49 |
| 7 | 6.48 | −2.44 | 0.92 | 1.25 | −0.82 |
| 8 | 5.19 | −6.20 | 7.41 | 0.08 | −8.95 |
| 9 | −19.28 | 4.91 | −1.25 | −4.39 | 1.43 |
| 10 | −1.60 | −1.42 | −1.26 | −0.39 | −1.47 |
| 11 | 0.52 | 0.71 | 0.99 | 1.76 | −3.81 |
| 12 | 0.0 | −0.01 | −0.11 | 0.62 | 6.05 |
| 13 | 16.73 | −0.90 | 0.05 | 3.43 | −0.19 |
| 14 | −7.14 | 1.43 | −0.29 | −2.40 | 0.54 |
| 15 | 0.12 | −0.42 | 1.51 | −0.22 | −4.59 |
| Σ | 0.15 | 0.02 | 0.11 | 0.13 | −4.11 |

Figure 10:
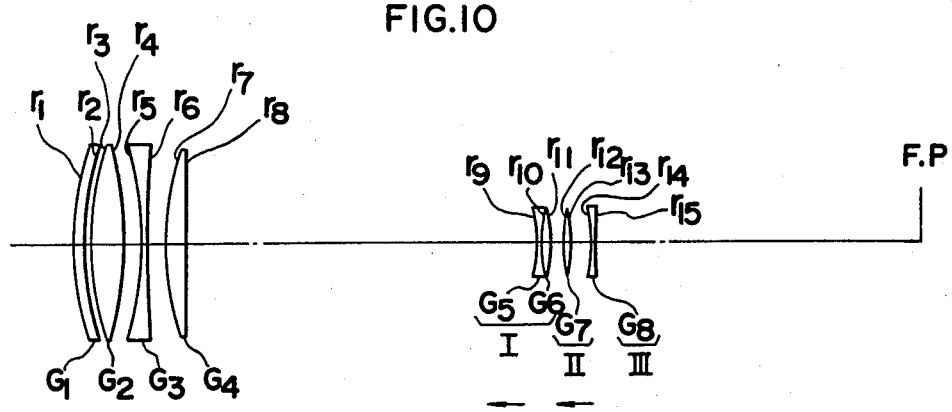
FIG. 10 is a cross-sectional schematic view showing a fourth embodiment of the lens system as Example 4.
Figure 11A:
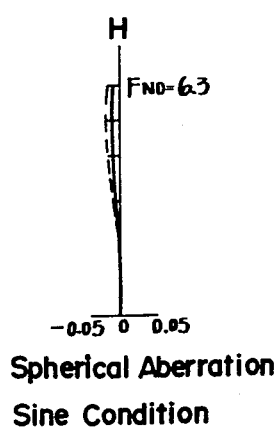
FIGS. 11A, 11B and 11C show respectively the spherical aberration, astigmatism and distortion when the fourth embodiment is focused at infinity, and FIGS. 12A, 12B and 12C disclose respectively the spherical aberration, astigmatism and distortion when the fourth embodiment is focused at 2,000.
Figure 11B:
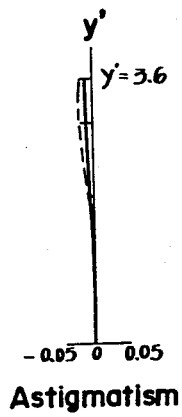
Figure 11C:
Figure 12A:
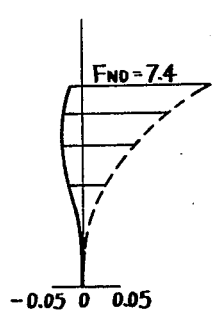
Figure 12B:
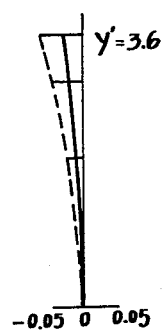
Figure 12C:
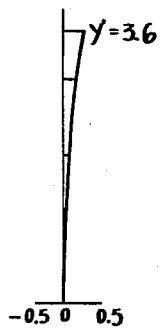

FIG. 10 sets forth a fourth embodiment in a schematic cross-sectional view. The above Table 8 sets forth FIGS. 11A, 11B and 11C disclose the respective aberration curves relevant to Example 4 when focused at infinity while FIGS. 12A, 12B and 12C disclose the relevant aberration curves when the telephoto system is focused at 2,000.

As can be readily appreciated, it is possible to deviate from the above embodiments of the present invention and as will be readily understood by those skilled in the art the present invention is capable of many modifications and improvements within the scope and spirit thereof. Accordingly, it will be understood that the invention is not to be limited by the specific disclosed embodiments but should be measured solely from the following claims, in which I claim.

What is claimed is:

1. In a telephoto lens system having improved focusing capabilities, the improvement comprising;

a front lens group of an overall positive refractive power; and a rear lens group of an overall negative refractive power including a first negative lens component on the object side of the rear lens group and a second positive lens component on the image side, the second positive lens component being movably mounted relative to other lens elements for focusing the lens system on close objects as it is moved towards the object side.

2. The invention of claim 1 wherein the rear lens group consists only of the first negative lens component and the second positive lens component.

3. The invention of claim 1 wherein the absolute value of the composite focal lengths, $f_M$, of the front lens group and the first negative lens component is greater than $1.2f$.

4. The invention of claim 3 wherein the absolute value of the radius of curvature, $r_F$, of the object side end surface of the second positive lens component is greater than the absolute value of the radius of curvature, $r_R$, of the image side end surface of the second positive lens component.

5. The invention of claim 4 wherein the focal length, $f_2$, of the second positive lens component is less than $0.8f$.

6. The invention of claim 5 wherein the rear lens group further includes a third negative lens component adjacent the image side of the second positive lens component.

7. The invention of claim 6 wherein the third negative lens component is fixidly mounted relative to the front lens group and the first negative lens component is movably mounted toward the object side with a lower differential speed ratio than the second positive lens component during a focusing mode of operation.

8. In a telephoto lens system having improved focusing capabilities, the improvement comprising;

a front lens group of an overall positive refractive power; and a rear lens group of an overall negative refractive power including a first negative lens component on the object side of the rear lens group, a second positive lens component on the image side of the first negative lens component, and a third negative lens component adjacent to the image side of the second positive lens component, the second positive lens component being movably mounted relative to the other lens elements for focusing the lens system on close objects as it is moved towards the object side, the first negative lens component being also movably mounted, the first negative lens component being mounted to provide a lower differential speed ratio than that of the second positive lens component during a focusing mode of operation.

9. An improved telephoto lens system having a simplified focusing mode of operation comprising the following design parameters:

Table 5

Embodiment 3

$f = 100$   F No.: 6.3   $2\omega = 4°\ 13'$
Telephoto Ratio: 0.684   Photographing Distance: $\infty$

| Radius of Curvature | | Axial Distance | Refractive Index | Abbe Number |
|---|---|---|---|---|
| $G_1$ $r_1 =$ | 28.799 | | | |
| | | $d_1 = 0.855$ | $n_1 = 1.5168$ | $\nu_1 = 64.0$ |
| $r_2 =$ | 25.206 | | | |
| | | $d_2 = 0.427$ | | |
| $G_2$ $r_3 =$ | 22.613 | | | |
| | | $d_3 = 2.632$ | $n_2 = 1.4339$ | $\nu_2 = 95.0$ |
| $r_4 =$ | $-36.991$ | | | |
| | | $d_4 = 1.381$ | | |
| $G_3$ $r_5 =$ | $-34.414$ | | | |
| | | $d_5 = 0.684$ | $n_3 = 1.757$ | $\nu_3 = 47.7$ |
| $r_6 =$ | 125.075 | | | |
| | | $d_6 = 1.776$ | | |
| $G_4$ $r_7 =$ | 24.738 | | | |
| | | $d_7 = 1.538$ | $n_4 = 1.5038$ | $\nu_4 = 66.8$ |
| $r_8 =$ | $\infty$ | | | |
| | | $d_8 = 29.414$ | (variable) | |
| I $G_5$ $r_9 =$ | $-9.001$ | | | |
| | | $d_9 = 0.256$ | $n_5 = 1.689$ | $\nu_5 = 49.4$ |
| $r_{10} =$ | $-33.714$ | | | |
| | | $d_{10} = 1.775$ | (variable) | |
| II $G_6$ $r_{11} =$ | 36.83 | | | |
| | | $d_{11} = 0.547$ | $n_6 = 1.5168$ | $\nu_6 = 64.0$ |
| $r_{12} =$ | $-10.809$ | | | |
| | | $d_{12} = 0.369$ | (variable) | |
| III $G_7$ $r_{13} =$ | $-18.978$ | | | |
| | | $d_{13} = 0.256$ | $n_7 = 1.6583$ | $\nu_7 = 57.3$ |
| $r_{14} =$ | 6.589 | | | |
| | | $d_{14} = 0.615$ | $n_8 = 1.5955$ | $\nu_8 = 39.4$ |
| $G_8$ $r_{15} =$ | $\infty$ | | | |

* * * * *